(No Model.)

J. A. WRIGHT.
WIRE COUPLING AND BINDING POST.

No. 583,242. Patented May 25, 1897.

Witnesses:

Inventor.
John A. Wright
By his Atty.

UNITED STATES PATENT OFFICE.

JOHN A. WRIGHT, OF WILKINSBURG, PENNSYLVANIA.

WIRE COUPLING AND BINDING POST.

SPECIFICATION forming part of Letters Patent No. 583,242, dated May 25, 1897.

Application filed January 11, 1897. Serial No. 618,791. (No model.)

*To all whom it may concern:*

Be it known that I, JOHN A. WRIGHT, a citizen of the United States, residing at Wilkinsburg, in the county of Allegheny and State of Pennsylvania, have invented certain new and useful Improvements in Wire Coupling and Binding Posts, of which the following is a specification.

My invention relates to improvements in wire coupling and binding posts by connecting wires either for electrical or other purposes.

The chief object of my invention is to provide a simple, inexpensive, and effective device for the purposes stated, and also to provide a device which will admit of the wires being joined or spliced, either in line one with the other or at any required angle one with the other.

My invention consists in certain details of construction embodied in a plug or screw shank with a central longitudinal bore at one end and with a cross-slot to connect therewith at the other and with a screw-cap adapted to fit over the slotted end of the screw-shank, as will hereinafter appear.

Figure 1:
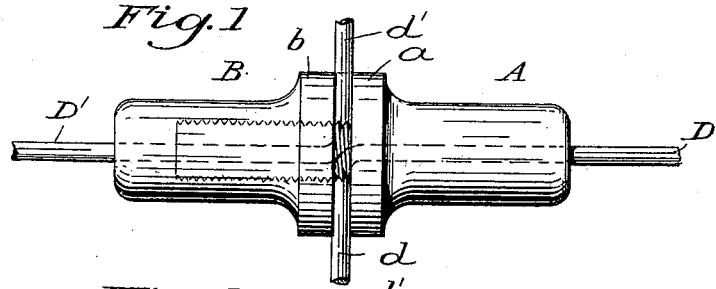
Figure 2:
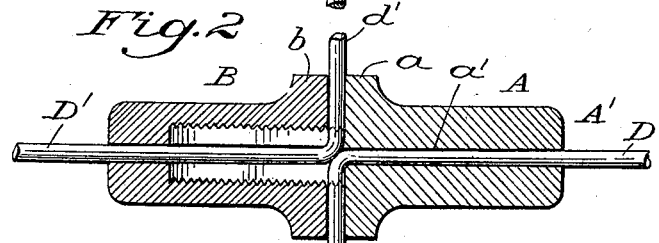
Figure 3:
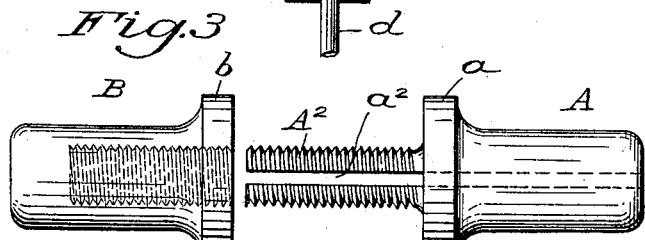
Figure 4:
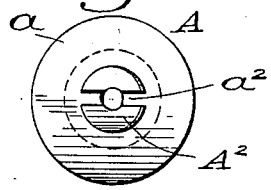
Figure 5:
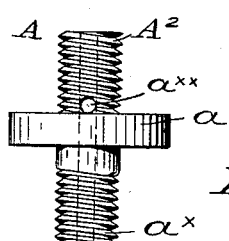
Figure 6:
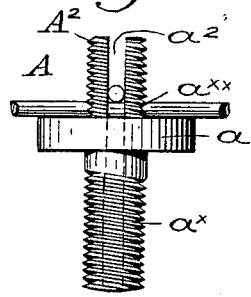
Figure 7:
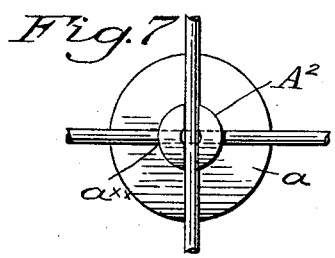

In the accompanying drawings, which illustrate my invention, Figure 1 is a side elevation of a wire-coupling which may be used to connect wires either on line or at right angles to each other. Fig. 2 is a longitudinal section thereof; Fig. 3, a side elevation of the two coupling-sections disconnected; Fig. 4, an end view of the screw-shank or plug-section of the coupling; Fig. 5, a side elevation of a stud-coupling or plug-binding post; Fig. 6, a similar view and at right angles to the modification shown in Fig. 5; Fig. 7, an end view of the said last-described binding-post with cross-wires connected therewith, and Fig. 8 a nut-cap for fitting over the binding-post.

In the first four figures of the drawings the coupling comprises a plug-section A and a cap-section B, adapted to screw upon the threaded plug to clamp the bent ends $d$ and $d'$ of the wires D and D' between them and provide two adjacent correspondingly-shaped sections having adjacent collars $a$ and $b$ and smoothly-finished outer surfaces.

The plug-section A has a centrally-bored hole $a'$ through the body A' thereof, through which the wire D is passed, and also a threaded portion $A^2$, through which a cross-slot $a^2$ is cut from the end to the collar $a$ thereof to allow the wire to pass first through the central hole $a'$ and then across the slot $a^2$ at right angles thereto and be clamped between the collars $a$ and $b$ of the two sections.

The cap-section B is made exteriorly to conform to the body of the section A and is bored out and tapped to receive the end of the threaded portion $A^2$ of the section A, and is also bored centrally and longitudinally with a small hole to receive the wire D' and allow it to pass through the cross-slot $a^2$ and be carried down to about the angle or elbow of the wire D, held by the section A, and be then turned at right angles from the coupling, as clearly shown in Figs. 1 and 2 of the drawings. A very secure end-for-end or line coupling between two wires may be thus readily effected. If, however, it is desired to connect one line of wire to the other at right angles therewith the short end of the wire to be connected to the cap-section of the coupling should be passed through the central hole of the cap and the line of wire should then be passed between and securely clamped by the collars of the wire-coupling.

A more simple and secure way of making a cross-wire connection is shown in Figs. 5, 6, and 7 of the drawings, and the said figures also show a screw plug or shank for securing the coupling or binding post to a board or table. In this instance the section A is provided with an exterior screw-thread $a^×$, which extends to the collar $a$, and is thus adapted to screw into a board, plate, table, or other object or to be passed through such object and be secured thereby by a nut. The threaded portion $A^2$ of the section A is provided with a cross-slot $a^2$, as in the first three figures of the drawings, and is also provided with a transversely-bored hole $a^{××}$ at right angles to the slot $a^2$ to receive one of the cross-wires and also allow the other of said wires to be brought in contact therewith and be securely clamped thereon by the collars of the two clamping-sections.

Figure 8:
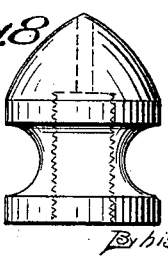

A cap-nut similar to that shown in Fig. 8 may be used upon the slotted end of the binding-post last described, if desired, to provide a suitable finish, and other changes of form to admit of the use of a wrench or pin-lever or for adapting the binding-post for special purposes may be employed without departing from my invention.

I claim as my invention and desire to secure by Letters Patent—

1. A wire-coupling comprising a plug-section having a central hole bored through the body thereof, and a cross-slot connected therewith through the threaded shank thereof, and a cap-section also provided with a central hole through the end thereof communicating with a threaded hole adapted to fit the said shank of the plug-section, substantially as described.

2. A binding-post consisting of a body having a centrally-bored hole to receive one of the wires a threaded shank provided with a cross-slot and a wire-hole at right angles thereto and communicating therewith and a screw-cap adapted to fit said shank substantially as described.

3. A binding-post consisting of a body, a threaded shank having a cross-slot and a wire-hole at right angles thereto and a screw-cap provided with a central longitudinal wire-hole at the end thereof, substantially as described.

In testimony that I claim the foregoing as my invention I have signed my name in the presence of two subscribing witnesses.

JOHN A. WRIGHT.

Witnesses:
GEORGE H. BLACKMORE,
WM. HARRIS.